United States Patent [19]

Beebe

[11] 4,422,336

[45] Dec. 27, 1983

[54] INSTRUMENTATION RESONANCE COMPENSATION

[75] Inventor: James C. Beebe, Medina, Ohio

[73] Assignee: Eagle-Picher Industries, Inc., Cincinnati, Ohio

[21] Appl. No.: 326,558

[22] Filed: Dec. 2, 1981

[51] Int. Cl.$^3$ .............................................. G01B 7/16
[52] U.S. Cl. ....................................... 73/769; 73/146; 364/571
[58] Field of Search ............ 73/146, 579, 602, 517 R, 73/517 B, 769; 364/571-576, 828

[56] References Cited

U.S. PATENT DOCUMENTS 2,959,347  11/1960  Kearns .............................. 73/517 R
3,479,867  11/1969  Tarpinian et al. ...................... 73/146

Primary Examiner—James J. Gill
Attorney, Agent, or Firm—Wood, Herron & Evans

[57] ABSTRACT

An analog compensation circuit for compensating for mechanical instrumentation resonance. The transfer function of the instrumentation resonance phenomenon is determined, and the compensation circuit is constructed to produce the inverse transfer function of the instrumentation resonance transfer function. The input of the compensation circuit is connected to the electrical instrumentation output signal. With the instrumentation resonance modeled as the equivalent of a second order filter, the compensation circuit includes sections for producing at a combined output a first intermediate signal representative of a constant term, a second intermediate signal representative of a first derivative term, and a third intermediate signal representative of a second derivative term.

6 Claims, 5 Drawing Figures

INSTRUMENTATION RESONANCE COMPENSATION

DESCRIPTION OF THE INVENTION

The invention relates generally to mechanical instrumentation systems and more particularly concerns an electronic compensation network for compensating for mechanical instrumentation resonance.

There are many instances in which the amplitude and timing of a mechanical force or moment are converted to an electrical signal to permit visualizing and/or recording the mechanical phenomena. In order to do this, certain instrumentation must be added to the mechanical system under consideration. The mechanical portions of the instrumentation cooperate with instrumentation circuitry to provide an instrumentation arrangement which produces at an output an electrical signal containing the desired electrical representation of the mechanical parameter of interest.

One conventional type of instrumentation is a strain gage, which is a device which relies upon the principle of a change of electrical resistance in a wire which is under tension in order to measure pressure, or force. A strain gage converts a mechanical motion into an electrical signal by means of the fact that when a wire is stretched, its length increases and its diameter decreases, and therefore its electrical resistance increases. The strain gage is attached to a piece of metal, a spindle or beam, which deforms elastically as pressure is applied. The strain gage resistance element is typically employed as a branch of a Wheatstone Bridge circuit so that resistance changes in the strain gage are reflected as changes in the output voltage of the bridge.

Since the degree of flexure of the beam upon which the strain gage is placed determines the degree of resistance change, and hence the level of the electrical output signal, the more flexible the beam, the greater the variation in the electrical signal. Thus, flexibility is analogous to sensitivity of the instrumentation. Such flexibility, of course, is detrimental to accuracy of the instrumentation arrangement, because of mechanical response characteristics of the instrumentation itself. The most accurate strain gage would have an infinitely stiff beam, but in that case the output signal would be imperceptible. Therefore, the flexibility of the mechanical portion of instrumentation of the strain gage type is of necessity a design compromise.

Illustrative of an industrial application in which a strain, gage type of instrumentation is used is a roadway simulation machine which permits study and recording of force and moment nonuniformities of tires. In such a machine, a tire and wheel assembly on a spindle is rotated by an endless drive belt. Six components of loading of the assembly are observed: the three orthogonal forces and three corresponding moments. An instrumented beam load cell which surrounds the spindle measures these orthogonal forces and moments. This load cell arrangement may be thought of as a collection of strain gages in a single piece of instrumentation with interconnections to six separate Wheatstone bridges. While the six separate output channels of the instrumentation bridges may be intermixed and processed in various ways to produce resultant information, initially each bridge output may be regarded as a single strain gage output.

In such a system, high sensitivity of the instrumentation to forces and moments is desirable. As will be recalled, however, in order to increase the sensitivity of the instrumentation, the beam structure carrying the strain gages must normally be made more flexible, introducing inaccuracies into the instrumentation output signal.

A particularly large spurious wave form which may be observed in the output of each of the channels of a load cell in such a sensitive roadway simulation machine is, for example, a damped sine wave signal, often large enough to mask the desired portion of the instrumentation output, produced in response to a mechanical impulse. This sine wave signal is a damped sine wave having a frequency which does not vary with the rotational speed of the tire and wheel assembly. This spurious damped sine wave is not a result of electrical oscillations in the electrical circuitry nor of mechanical oscillations in the major structural components of the machine.

Delivering impulses directly to the at-rest instrumented spindle itself produces the spurious high amplitude damped sine wave from the load cell outputs. In this static condition, modifying the system by loading and unloading the tire and wheel assembly from the spindle makes a small change to the resonant frequency and rate of decay, but the amplitude of the oscillation persists in substantially unchanged form. Thus, the cause of the oscillations is the load cell itself.

Modifications to the load cell to correct this problem would be time-consuming and subject to the danger of destroying essential sensitivity, accuracy, linearity and cross-talk characteristics of the load cell. Therefore, it would be preferred to find an electrical solution for the mechanical resonance effects introduced into the instrumentation output signal by the load cell structure.

It is the general aim of the invention, therefore, to provide an electrical compensation circuit for instrumentation systems of the foregoing type which will compensate for mechanical instrumentation resonance.

This objective has been accomplished in accordance with certain principles of the invention by providing an electronic compensation network which has an input coupled from the electrical signal output of an instrumentation arrangement and produces at an output an electrical signal substantially free of resonance effects, this network having a circuit made up of a plurality of sections which are interconnected to produce the inverse of the frequency domain transfer function representative of the resonance phenomena of the instrumentation.

Further objects and advantages of the invention, and the means by which they are met, will become apparent upon reading the following detailed description and upon reference to the drawings, in which.

Figure 1:
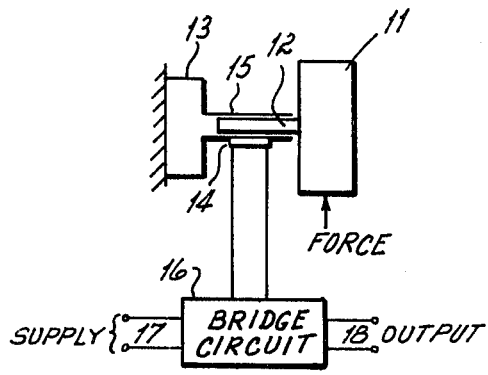
FIG. 1 is a diagrammatic illustration of a channel of a load cell instrumentation arrangement.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents and alternatives falling within the spirit and scope of the invention as defined by the appended claims.

Turning first to FIG. 1, there is shown in diagrammatic form a single channel of a load cell instrumentation arrangement for a roadway simulation machine. The above-described instrumentation resonance difficulties would typically be common to each channel, and therefore an exemplary channel has been selected to illustrate the operation of the inventive electronic compensation network. The instrumentation arrangement of FIG. 1 shall be considered to be herein the Y-axis (vertical direction) force channel of the load cell instrumentation.

As shown in FIG. 1, a tire and wheel assembly 11 is rotatable on a spindle 12 which is received in an instrumented beam load cell 15 mounted to the machine base 13. While in reality the six-component load cell surrounds the spindle 12 and carries a group of strain gages, for illustrative purposes a single strain gage element 14 is shown adjacent the beam 15. The strain gage 14 is responsive to vertical forces, as indicated by the arrow in FIG. 1, and is electrically connected as a leg in a standard bridge circuit and amplifier 16. In reality, the vertical forces on the tire and wheel assembly 11 may be detected by a combination of strain gages 14 disposed, for example, above and below the spindle 12 and electrically connected to an appropriate bridge arrangement.

The illustrated bridge circuit and amplifier 16 has an input 17 coupled to a conventional power supply and an output 18. The output 18 may be coupled to an oscilloscope, a strip chart recorder, or a processing circuit for working with the force data. In the present instance, in order to compensate for the mechanical resonance effects of the instrumentation, the output 18 is coupled through a compensation network, as shall be described in more detail hereinafter.

Figure 2:
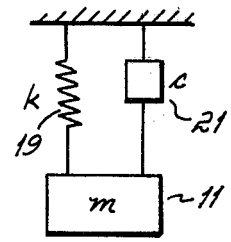
FIG. 2 is a diagrammatic illustration of a spring and mass damped system approximating one channel of instrumentation.

The deflection of the beam 15 affects the strain gage 14 mechanically, which is reflected in variations in the electrical output 18 of the bridge circuit 16. Therefore, the movement of the tire and wheel assembly 11 in response to vertical forces is converted to an electrical signal. The movement of the tire and wheel assembly 11 at the end of the beam 15 may be approximated as a simple spring/mass system, or a damped mechanical oscillator. Such a system is illustrated digrammatically in FIG. 2. The mass of the tire and wheel assembly 11 is, when acted upon by an external force, restored to its original position by the spring force of the beam 15. This spring force is illustrated diagrammatically as a spring 19. In reality, in an actual roadway simulation machine, a hub (not shown) of considerable mass is attached to the axle 12 and the tire and wheel assembly 11 is mounted on the hub. Normally, the mass of the hub is much more significant than the mass of the tire and wheel assembly, but the entire mass including that of the hub, wheel and tire shall be referred to herein as the mass of the tire and wheel assembly.

The spring force of the beam 15 is of a magnitude kx, within the elastic limits of the beam, where k is the spring constant of the beam and x is the amount of displacement of the end of the beam from horizontal. The beam 15 does not oscillate continuously after the application of an impulse force, but has an inherent damping which damps the oscillations of the beam. This damping force is illustrated as a damper 21, with the force being equal to cx'. The term c is a damping constant for the beam and x' is the beam velocity (the first derivative of position). These forces and an indication of a displacement x of the tire and wheel assembly from a reference position are illustrated in the force diagram of FIG. 3.

Figure 3:
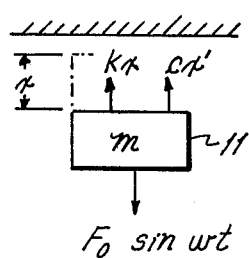
FIG. 3 is a force diagram corresponding to the system of FIG. 2.

The rotation of the tire and wheel assembly 11 on the spindle 12 creates vertical forces, such as due to imbalance or nonuniformities, in the form of $F_0 \sin wt$, where $F_0$ is the maximum force amplitude and w is the angular velocity of the tire and wheel assembly. This force is illustrated in FIG. 3 together with the spring force kx and the damping force cx'. The motion of the tire and wheel assembly 11, and hence the end of the spindle 15, is thus a harmonically excited motion. The differential equation of motion for such a system is:

$$mx'' + cx' + kx = F_0 \sin wt.$$

The mx'' term (mass times acceleration) is the resultant force acting upon the tire and wheel assembly 11. The term x'' is the second derivative of position.

There are two parts to the solution to the differential equation of motion. There is a complementary function, which is a damped free vibration, and there is a particular integral, which is a steady state oscillation at the exitation frequency. The portion of the solution of interest is the particular integral, which yields the nature of the steady state response of the system.

The particular solution is in the form:

$$x = X \sin(wt - \phi) \qquad (A).$$

In this equation, the quantities X and $\phi$ are:

$$X = F_0 / \sqrt{(k - mw^2)^2 + (cw)^2} \ . \qquad (B)$$

$$\phi = \tan^{-1} cw/(k - mw^2). \qquad (C)$$

In order to simplify the form of the solution of the differential equation of motion, several additional quantities may be defined. $W_n$ is the natural frequency of undamped oscillation; $c_c$ is the critical damping; and z in the damping factor. These terms are found from the following expressions:

$$w_n = \sqrt{k/m}$$

$$c_c = 2mw_n$$

$$z = c/c_c$$

Using these terms in a normalized frequency expression, the values of X and b are as follows:

$$X = (F_0/k) \ 1/\sqrt{[1 - (w/w_n)^2]^2 + [2z(w/w_n)]^2} \ . \qquad (D)$$

$$\phi = \tan^{-1} 2z(w/w_n)/[1 - (w/w_n)^2]. \qquad (E)$$

These quantities defining the harmonically excited motion of the instrumentation system are analogous to the electrical transfer characteristic of a second order filter. The Laplace transform of such a second order filter is $1/(s^2+ns+1)$. Since in the complex frequency domain s is equal to jw, or in a normalized expression $jw/w_n$, the amplitude and phase angle of this second order filter are:

$$\text{amplitude} = 1/\sqrt{[1 - (w/w_n)^2]^2 + [n(w/w_n)]^2} \quad \text{(F)}$$

$$\text{phase} = \tan^{-1} n(w/w_n)/[1 - (w/w_n)^2]. \quad \text{(G)}$$

The electrical analog of the mechanical resonance is a quantity which may be compensated, or corrected, by connecting in series, or multiplying by, circuitry representative of the inverse transform, which is $s^2+ns+1$. As can be seen from a comparison of equations (D) and (E) with equations (F) and (G), respectively, the quantity n is equal to 2z, the damping factor from the equations for the mechanical system. Thus, the desired inverse transform is $s^2+2zs+1$.

In order to provide a compensation circuit which has a transfer characteristic that is the inverse of that defined by the parameters of equations (D) and (E), the quantities $w_n$ and z must be determined. In one method for determining these parameters, the mechanical portion of the instrumentation arrangement is subjected to an impulse such as a hammer blow and the resulting damped harmonic response is observed. Such a response is illustrated in FIG. 4.

Figure 4:
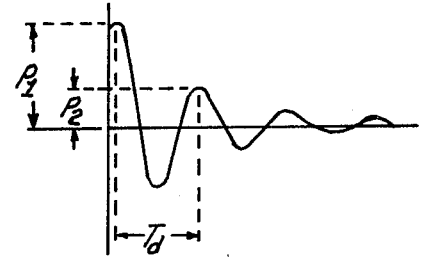
FIG. 4 is an illustration of a damped harmonic wave form illustrating mechanical instrumentation resonance response to an impulse input at the electrical signal output of the instrumentation.

In order to show how the quantities $w_n$ and z are determined from the impulse response wave form of FIG. 4, certain additional parameters must be defined. The quantity d is the logarithmic decrement and is defined as the natural logarithm of succeeding peak values of the FIG. 4 wave form. In other words, d is the natural logarithm of $p_1$ divided by $p_2$, the amplitudes of the first two peaks of the wave form of FIG. 4. The quantity $T_d$ is defined as the damped period of the wave form of FIG. 4 and is equal to $2\pi/w_n\sqrt{1-z^2}$. This damped period is the time between the two succeeding peaks of the wave form as illustrated in FIG. 4. Thus, these two quantities, d and $T_d$, may be empirically determined for a particular mechanical instrumentation arrangement on an experimental basis. The following equation relates these quantities for use in determining z and $w_n$:

$$d = zw_nT_d \quad \text{(H)}.$$

From the above definition of $T_d$, it can be seen that: $w_n 2\pi/T_d\sqrt{1-z^2}$. By combining equation (H) with the above-mentioned definition of $T_d$, it may be seen that: $z = d/\sqrt{4\pi^2 + d^2}$. Thus, $w_n$ and z may be empirically determined and used to define the inverse transform of the harmonically excited motion characteristic of the mechanical portion of the instrumentation.

Figure 5:
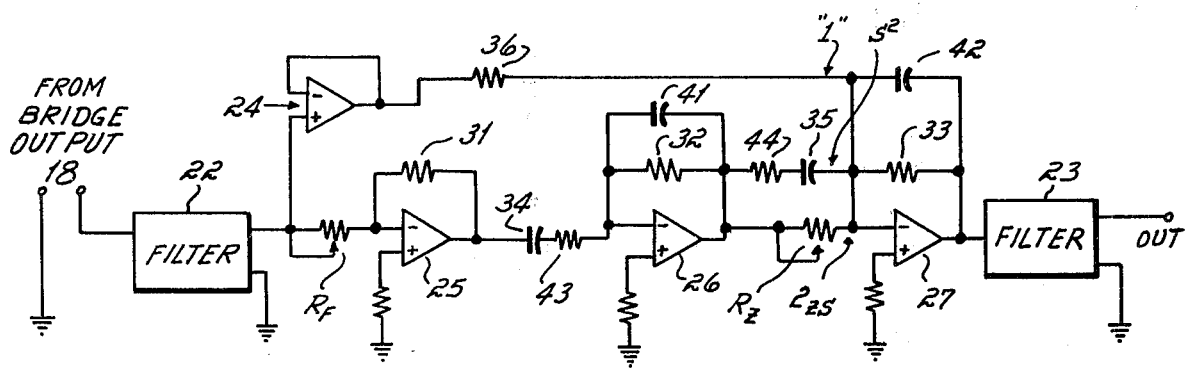
FIG. 5 is a circuit diagram of a compensation circuit for compensating for instrumentation resonance in accordance with the present invention.

Turning now to FIG. 5, there is illustrated a compensation network for implementing the inverse of the mechanical resonance transform to compensate for the instrumentation resonance. The output of the bridge circuit 18 is coupled to the input of a multi-stage filter 22. The output of the filter 22 is the input to the inverse transform network sections themselves, and the output of the compensation network is an input to a second multi-stage filter 23. The output of the filter 23 is the filtered, compensated output of the compensation circuit which may be utilized in any desired fashion such as for viewing on an oscilloscope or strip chart or for further processing. The filters 22 and 23 combine to form a multi-stage filter which provides unity gain and a flat response over the frequencies of interest. In the specific circuit illustrated, the frequencies of interest lie between about 0 hz (dc) and about 200 hz. The combined effect of the filters 22 and 23 is that of a sixth order filter having a pass band from dc to 200 hz. In one roadway simulation machine, the actual rotating speed of the tire and wheel assembly ranges from about ½ hz to about 25 hz. The resonance effects are troublesome when the mechanical resonant frequency lies within or below the frequency range of interest.

The compensation network comprises four operational amplifiers 24–27. The amplifier 27 serves to provide a summing junction at its inverting input for intermediate signals representing the $s^2$, 2zs and "1" terms of the inverse Laplace transform of the mechanical resonance. The three inputs to the summing junction which provide these signals are identified in FIG. 5.

The operational amplifier 27 also serves, in cooperation with surrounding circuitry, as both an amplifier and a differentiator. The implementation of the s term of the inverse transform requires a differentiation and the $s^2$ term requires two differentiations. The second differentiator comprises the amplifier 26 and its related circuitry.

The "1" term of the inverse transform is obtained by coupling the output of the filter 22 through a buffer amplifier 24 and a resistor 36 to the summing junction. The input resistor 36 is set equal to the feedback resistor 33 of the amplifier 27 so that the summed output is at unity gain.

The $s^2$ and s terms of the inverse transform are obtained by taking the second and first derivatives of the input signal after its amplitude has been scaled by the input amplifier 25. The amplifier 25 has a feedback resistor 31 and an input resistor $R_F$ to establish the gain of the amplifier, as shall be described in more detail hereinafter.

The first differentiation is performed on the signal from the output of the amplifier 25 by the differentiator comprising amplifier 26. The amplifier 26 has a feedback resistor 32 and an input capacitor 34. The output of the amplifier 26 has a value of s (times a scaling factor) and is subsequently further scaled in order to reach a value of 2zs as required for the inverse transform. This subsequent scaling is performed by the amplifier 27. The amplifier 27 has a feedback resistor 33 and an input resistor $R_z$ which is connected to the output of the amplifier 26. The gain of the amplifier ($R_{33}/R_Z$) necessary to obtain the 2zs signal shall be calculated below.

The amplifier 27 also serves to produce the $s^2$, or second derivative, term. This is accomplished by differentiating the output of the amplifier 26. The output of the amplifier 26 is a first derivative, and this output is coupled through an input capacitor 35 to the summing junction with the result that the amplifier 27 performs a second differentiation of the amplifier 26 output.

When an input signal is coupled to one of the amplifiers through an input resistor, the gain of the amplifier as to that signal is equal to the value of the feedback resistor of the amplifier divided by the value of the input resistor. When a signal is coupled to one of the amplifiers through an input capacitor, the amplifier serves as a differentiator and the amplitude of the output of the amplifier is a product of the values of the feedback resistor, the input capacitor, and the signal frequency.

Therefore, in order to provide a signal having an amplitude of $s^2$ at the natural frequency of undamped oscillation $w_n$ at the summing junction, the effects of the various amplifiers must, when multiplied together, equal a value of "1". The following expression must therefore hold:

$$[(R32)(C34)(w_n)][(R33)(C35)(w_n)][(R31)/(R_F)] = 1.$$

In this expression, the first bracketed term is the gain of the differentiation stage comprising the amplifier 26 at the resonant natural angular frequency $w_n$, and the second bracketed term is the gain at $w_n$ of the differentiator comprising the amplifier 27. The third bracketed term in the expression is the gain of the input amplifier 25.

In an exemplary embodiment of the illustrated circuit, with the resistors 31–33 equal to 10K ohms and the capacitors 34 and 35 equal to 0.1 microfarads, $R_F$ is then equal to $0.01\ w_n^2$.

In order to establish the $2zs$ term at the $w_n$ frequency at the summing junction, the following expression must hold:

$$[(R32)(C34)(w_n)][(R31)/(R_F)][(R33)/(R_Z)] = 2z.$$

The first term of this expression is again the gain of the differentiator comprising the amplifier 26 at the resonant natural angular frequency $w_n$. The second bracketed term is again the gain of the input amplifier 25. The third bracketed term is the gain of the amplifier 27 considering the input resistor $R_Z$ and the feedback resistor 33. Utilizing the above-mentioned values of 10K ohms and 0.1 microfarads for the resistors and capacitors, and substituting the value of $R_F$, in terms of $w_n$ obtained above, yields a value for $R_Z$ of $(10^7)/2zw_n$. The terms $z$ and $w_n$ are, it will be recalled, determined experimentally from the impulse response of the mechanical instrumentation system.

As stated earlier, in order to provide a unity term at the summing junction, the resistor 36 at the output of the buffer amplifier 24 is set equal to the feedback resistor 33 of the amplifier 27. In the exemplary case, the resistor 36 is than also 10K ohms.

It can be seen that by determining $w_n$ and $z$ experimentally, the compensation circuit as illustrated in FIG. 5 is fully defined. In the compensation circuit, the capacitors 41 and 42 in parallel with the feedback resistors 32 and 33, respectively, are for stability of the differentiator circuitry. These capacitors are normally significantly smaller than the capacitors 34 and 35 and do not have a bearing on the circuit calculations. This is also the case for the resistors 43 and 44 which are also provided for stability and are much smaller than the feedback resistors 32 and 33. The selection of values for these components is to some extent dictated by the amplifiers used and is in accordance with conventional operational amplifier differentiator design.

While the instrumentation resonance in the present example has been modeled as a second order filter, with the compensation network comprising an inverse transform of this second order filter expression, in appropriate circumstances instrumentation resonance may be modeled as, for example, a higher order filter. In that case, a suitable compensation network involves additional differentiation stages, but the principle or providing the inverse transform of the mechanical instrumentation resonance expression is the same.

The means for producing the inverse transform of the instrumentation characteristic need not be an electrical circuit having discrete components as illustrated in the exemplary embodiment herein. It would be possible, for example, to operate upon the instrumentation output signal using a programmed computer or processor. The operations of producing and combining a constant term, a first derivative term, and a second derivative term are readily performed by a computer.

What is claimed is:

1. An electronic compensation network, for compensating for mechanical instrumentation resonance in an instrumentation system which is responsive to a mechanical actuation to produce an electrical instrumentation output signal, the instrumentation system having a mechanical response characteristic representative of mechanical resonance which is substantially that of a simple resonant system having an equivalent transfer function in the form of an electrical second order filter comprising an electronic circuit having:
    an input coupled to the electrical instrumentation output signal of the instrumentation system,
    a plurality of sections which are interconnected to produce the inverse of the transfer function of the instrumentation resonance, the sections being interconnected to combine a first function representative of a constant term, a second function representative of a first derivative term, and a third function representative of a second derivative term, all of which operate upon the signal at the input to the compensation circuit, and
    coupled to the combined outputs of the interconnected circuit sections, an output at which is produced a compensation network output signal which is a substantially accurate representation of the mechanical actuation.

2. The compensation network of claim 1 in which two of the sections of the circuit, representing the functions of the first and second derivatives, comprise operational amplifier differentiators.

3. An instrumentation arrangement for producing an output signal substantially free of the effects of mechanical instrumentation resonance comprising an instrumentation system which is responsive to a mechanical actuation to produce an electrical instrumentation system output signal, the instrumentation system having a mechanical response characteristic representative of mechanical resonance which is substantially that of a simple resonant system having an equivalent transfer function in the form of an electrical second order filter, and an electronic compensation circuit having:
    an input coupled to the electrical instrumentation system output signal,
    a plurality of sections which are interconnected to produce the inverse of the transfer function of the instrumentation resonance, the sections being interconnected to combine a first function representative of a constant term, a second function representative of a first derivative term, and a third function representative of a second derivative term, all of which operate upon the signal at the input to the compensation circuit, and
    an output coupled to the combined outputs of said sections at which is produced an instrumentation arrangement output signal which is a substantially accurate representation of the mechanical actuation.

4. The instrumentation arrangement of claim 3 in which two of the sections of the circuit, representing the functions of the first and second derivatives, comprise operational amplifier differentiators.

5. An instrumentation arrangement for producing an instrumentation arrangement output signal substantially free of mechanical instrumentation resonance effects comprising an instrumentation system which is responsive to a mechanical actuation to produce an electrical instrumentation output signal, the instrumentation system having a mechanical response characteristic representative of mechanical resonance, and compensation means, having an input coupled to the electrical instrumentation output signal of the instrumentation system and having an output, for simulating the inverse of the transfer function of the instrumentation resonance to produce at the output of the compensation means an instrumentation arrangement output signal which is a substantially accurate representation of the mechanical actuation, the compensation means including means for operating upon the electrical instrumentation output signal to produce a constant term, a first derivative term, and a second derivative term, and means for combining said terms to produce the instrumentation arrangement output signal.

6. A method for compensating electrically for mechanical instrumentation resonance effects upon the electrical output signal of an instrumentation arrangement, which resonance may be substantially modeled as that of a simple resonant system, corresponding in characteristic to the transfer function of a second order electronic filter, comprising the steps of:
determining from the damped harmonic response of the instrumentation system the damping factor and the natural frequency of undamped oscillation of the instrumentation arrangement;
determining the transfer function of the simple resonant simple modeling the instrumentation arrangement;
arranging a compensation circuit having an input and an output and having the inverse transfer function of the simple resonant system of the instrumentation arrangement; and
coupling the input of the compensation circuit to the electrical output signal of the instrumentation arrangement to produce at the compensation circuit output an electrical instrumentation signal substantially free of the effects of the instrumentation resonance.

* * * * *

UNITED STATES PATENT AND TRADEMARK OFFICE
CERTIFICATE OF CORRECTION

PATENT NO. : 4,422,336

DATED : December 27, 1983

INVENTOR(S) : James C. Beebe

It is certified that error appears in the above-identified patent and that said Letters Patent is hereby corrected as shown below:

In column 5, line 50, between "$w_n$" and "2 ", insert --=--.

In column 7, line 44, "than" should be --then--.

In column 7, line 66, "or" should be --of--.

In column 10, line 13, "simple" should be --system--.

Signed and Sealed this

Seventeenth Day of April 1984

[SEAL]

Attest:

GERALD J. MOSSINGHOFF

Attesting Officer

Commissioner of Patents and Trademarks